2,894,880

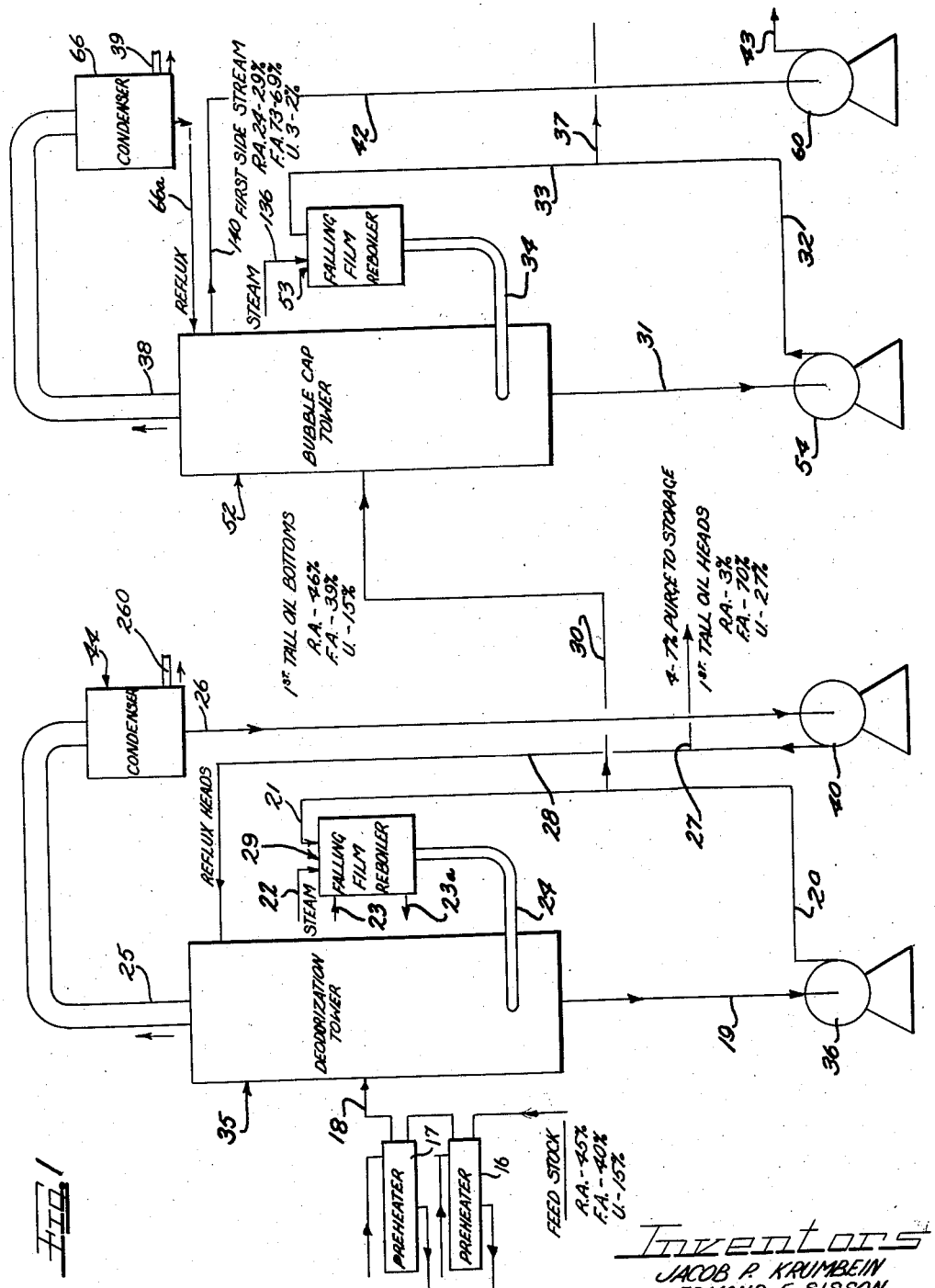

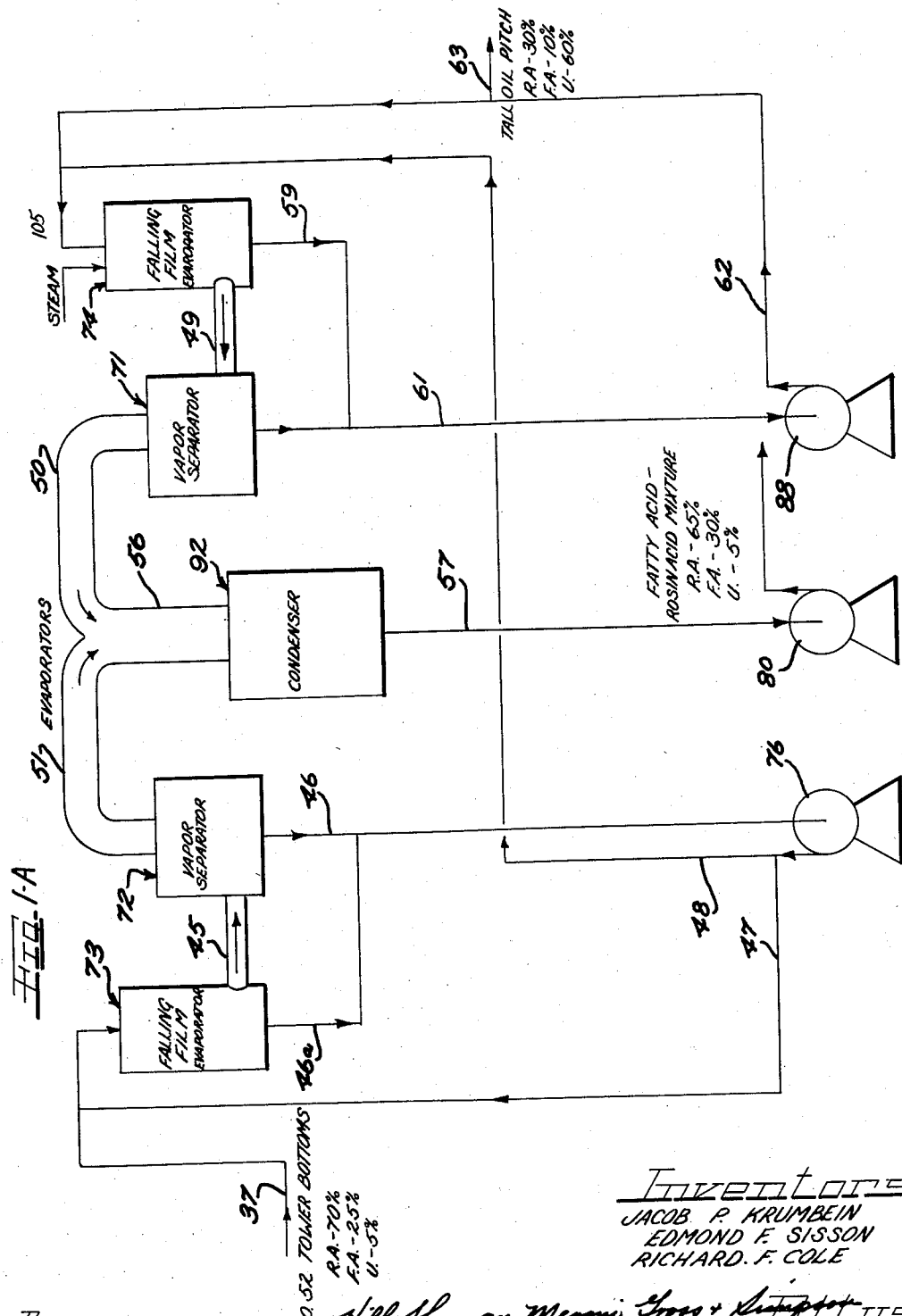

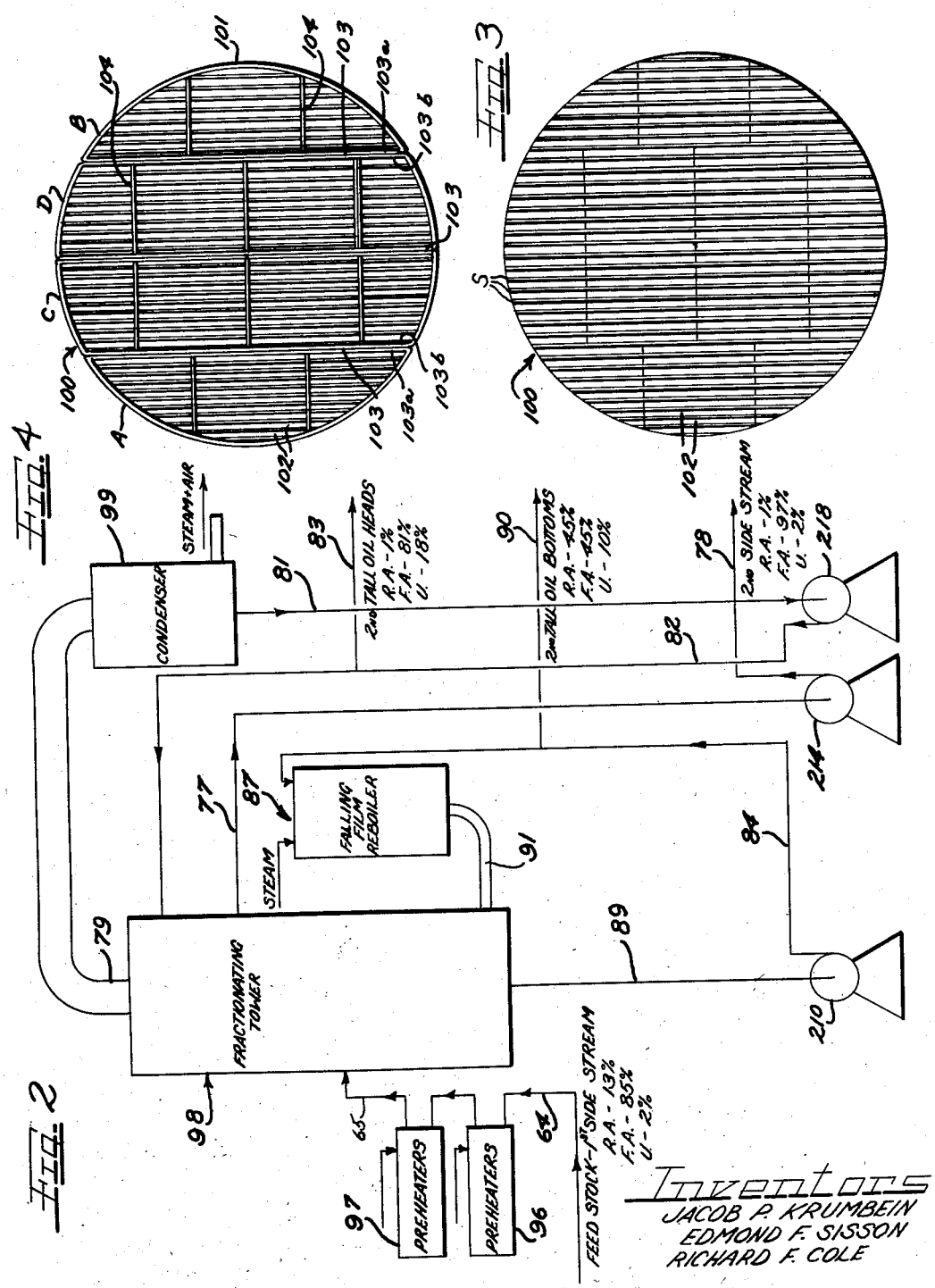

METHOD OF FRACTIONATING TALL OIL INTO FATTY ACIDS AND ROSIN ACID PRODUCTS

Edmond F. Sisson, Richard F. Cole, and Jacob P. Krumbein, Pensacola, Fla., assignors, by mesne assignments, to Heyden Newport Chemical Corporation, New York, N.Y., a corporation of Delaware Application September 12, 1955, Serial No. 533,704

10 Claims. (Cl. 202—52)

This invention relates to a method of fractionating tall oil for the production therefrom of a fraction that is substantially pure fatty acids and of other fractions containing commercially desirable admixtures of fatty acids and rosin acids.

One of the principal difficulties encountered in the fractional distillation of tall oil is due to odoriferous substances, either initially present or generated as a result of thermal decomposition. Unless the fractionating method is capable of producing a fatty acid product having the characteristic bland odor of fatty acids, and free of any tall oil odor, the method cannot be said to be highly satisfactory.

Our present method, in an initial step, removes much of the odoriferous substances already in the tall oil by removing a heads fraction containing relatively low boiling point unsaponifiables, or neutrals, which may be or contain color bodies. These are removed at an early state at a relatively low temperature and under conditions of extremely low pressure differentials, and without the use of an excessive proportion of steam. In other words, the odoriferous substances, either actual or potential, are removed under conditions that do not give rise to the substantial formation of additional odoriferous bodies, either at that stage or at a later stage in the process. Higher temperatures than we employ during this initial step would result in greater decomposition of those components of the tall oil that lead to the production of odoriferous substances and color bodies.

In the removal of the low boiling unsaponifiables we employ a type of equipment not heretofore used to the best of our knowledge in tall oil fractionation. The equipment to which we refer is one that has been developed by Shell Development Company and is known as Turbogrid distillation trays. These trays are grid-like in form and are made up of bars, preferably rectangular in cross-section, of such dimensions and so arranged as to provide optimum surface spacings for fractionation of liquids with a minimum pressure differential between trays at successive levels in the tower that houses them. As compared with bubble-cap towers, a Turbogrid tower provides a much lower pressure differential for the same fractionating effect at the same feed rate.

Another feature of our invention is in the use of falling film evaporators as reboilers for the liquid going to the Turbogrid and also to the bubble cap towers used in our method. Steam is admitted with the recirculated tower liquid into the falling film evaporators in such proportions as to maintain equilibrium between the vapors, the liquid and the steam. By introducing the steam into the reboiler, rather than into the bottom of a fractionating tower, it is possible to obtain the desired equilibrium conditions and get greater efficiency from the amount of steam used. Where the efficiency of steam consumption, if the steam were introduced into the bottom of a fractionating tower, would be in the neighborhood of 60%, the efficiency realized by our method is 100%. The introduction of steam at the reboiler instead of directly into the bottom of the tower also enables lower temperatures to be maintained in the bottom of the tower, with a consequent reduction in losses due to thermal decomposition of unstable components in the tall oil.

Still a further feature of our invention is the removal of a side stream from the fractionating towers. If the distillate were taken off of the top of the towers it would have a higher color and odor than when taken off as a side stream. Instead, only a relatively small proportion of heads is taken off at the tops of the fractionating towers, and thus the more volatile odoriferous and color components are removed in the heads rather than in the side stream take-offs.

Another feature of our method is the use of a plurality of series arranged falling film evaporators and vapor separators with a common condenser for the combined vapors from the vapor separators. This arrangement of series evaporators with a common condenser results in lower equipment cost than any conventional arrangement. The falling film evaporators receive the bottoms from one of the fractionating towers and by the use of heated organic vapors (Dowtherm) effect a partial vaporization of such bottoms, which are then flashed into the respective vapor separators associated with the falling film evaporator. A certain amount of liquid from the vapor separators is returned to its associated evaporator to maintain a constant flow in the falling film evaporator to keep the tubes wet. The greater proportion of vapors is taken off in the first falling film evaporator at a temperature low enough to be free from thermal decomposition effect and thus a lesser proportion of thermal sensitive material goes to the other falling film evaporator. Also, due to the low pressures maintained in the vapor separators, the pitch removed as unvaporized liquid from the vapor separators has a minimum proportion of rosin acids.

As shown on the drawings:

Figures 1 and 1A together provide a flow sheet illustrating the first part of our method;

Figure 2 is a flow sheet illustrating the further steps of our method;

Figure 3 is a perspective top view of a grid; and

Figure 4 is a perspective bottom view of a grid used in the grid towers of our system.

On the drawings:

The starting material is preferably a crude tall oil, although tall oil in any of its various states of refinement may be employed. Also, our method is applicable to mixtures of fatty acids having different boiling points, as well as to tall oil. However, since the method is particularly applicable to tall oil, it will be described in connection with tall oil.

As is well known, tall oil is a by-product in the making of sulfate, or kraft, pulp by the cooking of coniferous woods, particularly jack pine, by the use of sodium sulfide-sulfate-alkaline cooking liquors. As a result of such cooking procedures, a "soap" is formed that comprises a mixture of saponified fatty and resin acids and is recovered from the spent cooking liquor as "skimmings." By acidification of the skimmings, the free fatty and resin acids are released and isolated as so-called tall oil.

The composition of crude oil varies considerably, but, in general, has an analysis within the following ranges expressed as percentages by weight:

| | Percent |
|---|---|
| Rosin acids (R.A.) | 35–55 |
| Fatty acids (F.A.) | 35–50 |
| Unsaponifiables and neutrals (U.) | 10–15 |

The fatty acids are largely composed of linoleic, linolenic and oleic acids, as the unsaturated fatty acids, with a minor proportion of a saturated fatty acid, palmitic. The resin acids are those commonly known as rosin acids, and include abietic acid.

We prefer to start with a crude tall oil that has not been subjected to resolution prior to distillation. This is a more desirable raw material in that increased yields, lower operating costs and the production of a more saleable tall oil pitch can be attained. Our process enables us to produce products of high quality and increased market value. These include the following:

(1) A first side stream product, the composition of which may be varied depending upon whether a saleable product is desired, in which case the following range of composition is typical:

| | Percent |
|---|---|
| R.A. | 24–29 |
| F.A. | 73–69 |
| U. | 3–2 | or, whether the side stream product is to be further processed in accordance with the process illustrated by the flow sheet (Fig. 2), in which case the composition is adjusted to the following:

| | Percent |
|---|---|
| R.A. | 13 |
| F.A. | 85 |
| U. | 2 |

(2) A second side stream product of substantially pure fatty acids comprising:

| | Percent |
|---|---|
| R.A. | 1 |
| F.A. | 97 |
| U. | 2 |

(3) A tall oil pitch of about 40° C. melting point comprising:

| | Percent |
|---|---|
| R.A. | 30 |
| F.A. | 10 |
| U. | 60 |

(4) A first tall oil heads fraction comprising:

| | Percent |
|---|---|
| R.A. | 3 |
| F.A. | 70 |
| U. | 27 |

(5) A second tall oil heads fraction comprising:

| | Percent |
|---|---|
| R.A. | 1 |
| F.A. | 81 |
| U. | 18 |

(6) Various fatty acid-rosin acid mixtures as the market may require, such as the following:

| | Percent |
|---|---|
| R.A. | 65 |
| F.A. | 30 |
| U. | 5 |

(7) A second tall oil bottoms of residue drawn off to crude oil storage for redistillation, comprising:

| | Percent |
|---|---|
| R.A. | 45 |
| F.A. | 45 |
| U. | 10 |

In the flow sheets of the drawings, in which a simplified embodiment of our method is illustrated, the starting material is a crude tall oil having the following typical composition:

| | Percent |
|---|---|
| R.A. | 45 |
| F.A. | 40 |
| U. | 15 |

The crude tall oil of the above composition is introduced successively through preheaters 16 and 17, which are respectively heated by steam and suitable organic vapors (Dowtherm) to raise the temperature of the crude tall oil from, say, 70° C. to 150° C. and then to 225° C. From the preheater 17, the liquid crude tall oil is passed through a pipe 18 into a tower 35 at substantially the mid-height thereof. Any of several different trays at or near the mid-point of the tower 35 can be selected as the feed tray. The tower 35 is preferably a Turbogrid tray distillation tower having trays or grids of the type and construction more particularly shown in Figures 3 and 4, and specifically described hereinafter. The tower 35 serves primarily as a "deodorization" tower to remove moisture, low boiling color bodies and unsaponifiables from the feed stock.

The Turbogrid tower 35 is maintained under reduced pressure such that, for example, the top of the tower is at 10 to 12 mm. of mercury pressure, absolute, and a corresponding temperature of about 210° C., and the bottom of the tower is preferably maintained at 30 mm. of mercury, and a corresponding temperature of 260° C., or not over about 270° C. The feed temperature to the tower is about 225° C. Hereafter, unless otherwise specified all pressures will be given in millimeters of mercury, absolute pressure. Due to the reduced pressure in the tower 35 and, as will later be explained in greater detail, the presence of steam in the tower, the preheated liquid tall oil entering the tower 35 is largely vaporized within the tower 35. The vapors rise through the grid-like trays with which the tower is packed, while the liquid phase passes slowly downwardly, trickling over the trays, and is constantly in equilibrium with the vapor and steam partial pressures at any given height in the tower. Preferably, there is no side stream draw-off from tower 35.

The liquid phase within the tower 35 is discharged from the bottom of the tower through a pipe 19 into a pump 36, or, for practical reasons, into either of two pumps, of which only the one pump 36 is shown. In general, duplication of pumps and of pipe lines, and the provision of tanks, have been eliminated for the sake of simplicity. From the pump 36, a portion of the liquid withdrawn from the tower 35 is pumped through a pipeline 20—21 into the upper end of a falling film evaporator 29, used as a reboiler for said liquid before returning the same to the tower 35 through a pipe 24 for recycling.

Steam is also introduced with the recycled liquid tall oil into the reboiler 29. The steam is introduced into the top of the reboiler 29 through a pipe 22. The construction of falling film evaporator that we prefer to use is more particularly described in our Patent No. 2,688,590, dated September 7, 1954. It is sufficient to say that the evaporator 29 comprises a plurality of vertical tubes having upper and lower header plates defining therebetween a chest for the reception of heated organic vapors (Dowtherm) introduced into such chest through an intake pipe 23 and discharged therefrom through an outlet 23a.

As is the case wherever indirect heating is provided for herein by the use of organic vapors, the liquid, which may be a mixture of diphenyl and diphenyl oxide, is separately heated to above its vaporization point, and during indirect heating of the fluid thereby, the vapors are cooled to below their boiling point so as fully to utilize the latent heat of vaporization. This is so well understood as to require no further elaboration. Thermostatic controls are provided at all necessary points in the system to insure proper temperatures at those points, correlated with the temperatures and volumes of the heating fluid (steam and inorganic vapors) employed for direct and indirect heating.

With respect to the amount of steam introduced into the reboiler 29, if it be assumed that the feed of crude tall oil is at the rate of 7330 lbs. per hour, and the temperatures and pressures are those already specified for the preheaters 16 and 17 and the tower 35, about 175 lbs. of steam per hour and about 90 gals. of recycled liquid tall oil per minute are introduced into the reboiler 29, while about 15,600 lbs. per hour (max.) of organic vapors (Dowtherm) will be required for the indirect heating of the fluid flow through said reboiler.

From the bottom of the reboiler 29, a pipe 24 conducts the mixed vapors, steam and liquid to the lower portion of said tower 35. The steam and vapors pass upwardly through said tower in equilibrium with each other and with the liquid trickling downwardly over the grid trays in the tower. Due to the construction, arrangement and proper proportioning of surface areas and voids or spaces between the bars of each grid tray and between successive trays, and also due to the introduction of the steam into the reboiler 29, rather than directly into the bottom of the tower 35, equilibrium conditions can be and are easily and constantly maintained within said tower 35.

From the top of the tower 35, the vapors containing moisture, low boiling color and odor bodies, and unsaponifiables are led off through a pipe 25 to a condenser 44, which is connected at its lower end by a pipe 260 to a series of barometric condensers and steam eductors (not shown), such as are well known to those familiar with the art of vacuum distillation. On the same basis of rates of feed, steam, etc., peviously given, about 150 lbs. per hour of steam and 4800 lbs. of fatty acids per hour are conducted out of the top of the tower 35 through the pipe 25 into the condenser 44 for return as reflux to the tower 35 or for removal as the first tall oil heads, as will now be explained in greater detail.

From the bottom of the condenser 44, the condensate is conducted through a pipeline 26 to a pump 40, from which is discharged out of the system a portion of the condensate, say, 330 lbs. per hour, amounting to a purge of from 4 to 7% of the feed stock. The portion of the condensate so removed from the system is designated as first tall oil heads, and is run through a line 27 to storage. The balance of the liquid passing through the pump 40, approximately 4470 lbs. per hour, is conducted as reflux heads, back to the top of the tower 35 through the pipeline 28.

The composition of the first tall oil heads is that already as item 4, viz.:

| | Percent |
|---|---|
| R.A. | 3 |
| F.A. | 70 |
| U. | 27 |

It is this relatively small heads fraction that contains a large proportion of the low boiling components that include the odoriferous and color components and those components of the crue tall oil which, if left in the system, would thermally decompose later on to give additional quantities of odors and color bodies. By continuously purging the system of odors and color bodies, actual or potential, by removing the same at this early stage under relatively low temperature conditions, it is possible to obtain final products free from the characteristic tall oil odor.

The portion of the bottoms, about 7006 lbs. per hour, not recycled through the reboiler 29 back to the tower 35, is led from the pipe 20 through a pipe 30 to the mid-height portion of a bubble cap tower 52, or other suitable fractionating tower. The composition of these tall oil bottoms is:

| | Percent |
|---|---|
| R.A. | 46 |
| F.A. | 39 |
| U. | 15 |

The top of the tower 52 is maintained at a pressure of about 55 mm. of mercury and at a temperature of about 188° C., while the lower portion is under a pressure of about 100 mm. of mercury and at a temperature of about 235° C. The tower is of the conventional bubble cap type with, for instance, 100 trays more or less. The tower 52 has three outputs exclusive of non-condensible vapor losses; (1) the overhead material, which is again the source of reflux less a small purge taken to heads; (2) a side stream taken 6 or 8 trays from the top to produce a final commercial product, and/or the feed for a third tower; and (3) the bottoms that are drawn off in the manner and for the purpose next to be described.

The bottoms from bubble cap tower 52 are conducted through a pipe 31 to a pump 54, from which a portion of the bottoms are led through 32—33 to a second falling film evaporator 53, used as a reboiler for reheating and returning bottoms through a line 34 to the lower portion of the tower 52. Steam is also introduced into the reboiler 53, as by means of an intake pipe 136.

On the same basis of flow inputs previously given, approximately 3000 lbs. per hour of steam and 100 gal. per min. of recycled bottoms are fed into the reboiler 53, while 113 gal. per min. of bottoms are being withdrawn by the pump 54 from said tower 52. The balance, or about 5380 lbs. per hour, of bottoms from the pump 54 are sent through a branch pipeline 37 to a falling film evaporator 73, as part of a vaporization system later to be described. This enables a constant level of liquid to be maintained in the reboiler 53.

From the top of the bubble cap tower 52, a vapor pipe 38 takes off the fatty acid vapors and steam at the rates, respectively, of 7100 lbs. per hour and 3000 lbs. per hour, and conducts them to a condenser 66. The condensate from the condenser 66, as previously stated, is returned as reflux through a pipeline 66a (shown broken away to indicate omission of pump and connecting pipelines), to the bubble cap tower 52 less a small purge that is removed from the system (by means not shown) to eliminate further quantities of actual or potential color and odor bodies, and unsaponifiables. The uncondensed steam and air from the condenser 66 pass through an outlet 39 into a header (not shown) and into the series of barometric condensers and steam eductors previously referred to.

A pipeline 140 conducts a liquid side stream at a temperature of about 225° C. from near the top of the tower 52 to a pipe 42 leading into a pump 60. From the outlet side of the pump 60, a pipeline 43 conducts a first side stream product to storage for sale, or for further processing in a manner indicated in Figure 2. The composition of said product as produced for sale may be varied at will between relatively wide ranges, to meet market requirements, but the following composition range is typical:

| | Percent |
|---|---|
| R.A. | 24–29 |
| F.A. | 73–69 |
| U. | 3–2 |

This first side stream product has a commercial market when of the composition indicated, but obviously the composition of this product as well as of other products referred to here can be varied to meet the market demands, both as to composition and volume produced. On the same basis as previously given for the flow rates, the first side stream product of the above given composition amounts to about 3500 lbs. per hour.

If the first side stream product is to be further processed as later described in connection with the flow sheet of Figure 2, its composition is preferably adjusted to approximately the following:

| | Percent |
|---|---|
| R.A. | 13 |
| F.A. | 85 |
| U. | 2 |

The bottoms from the tower 52, having the composition shown in Figure 1–A, are pumped by the pump 54 through the pipeline 32 and branch line 37 into the top of the falling film evaporator 73. The construction of said evaporator is preferably the same as that described in our above referred to patent. The evaporator 73 is connected near the bottom by a conduit 45 into a point near the bottom of the separator 72. The liquid from the bottom of the vapor separator 72 is conducted to a pipeline 46, into which the bottoms from the falling film evaporator are also discharged through a pipeline 46a, and the combined stream then led through said line 46 to a pump 76. The discharge from said pump 76 is split, a portion being pumped through a pipeline 47 for recirculation through the evaporator 73 and the vapor separator 72, and the balance being pumped through a branch pipeline 48 to the top of a falling film evaporator 74, which with a vapor separator 71, forms the second unit of the vaporization system shown in Figure 1–A.

The falling film evaporator 74 is connected at its lower end to the lower portion of the vapor separator 71 by a conduit 49. The overheads from both of the vapor separators 71 and 72 are conducted through piping 50 and 51, respectively, into the common intake 56 of a common condenser 92. From the condenser 92, the condensate is led through a pipe line 57 into a pump 80. This condensate, typically, is a fatty acid-rosin mixture that is marketable as such, and, as given in connection with item 6 above, may have the following composition:

| | Percent |
|---|---|
| R.A. | 65 |
| F.A. | 30 |
| U. | 5 |

Referring now to typical conditions of operation of the vaporization system including the two falling film evaporator and vapor separator units in series and the common condenser combined therewith, the evaporator 73 is indirectly heated by Dowtherm to impart a temperature to the liquid and vapors discharged therefrom of about 245° C. The vapor separator 72 is operated under a vacuum of about 2 mm. of Hg and with a temperature at the top of about 220° C. and at the bottom of about 245° C. The falling film evaporator 74 is indirectly heated by Dowtherm to impart a temperature to the liquid and vapors discharged therefrom of about 265° C., or 20° C. higher than the temperature at a corresponding point in the evaporator 73. This same temperature difference holds true as between the vapor separators 71 and 72, but the degree of vacuum is the same, viz. 2 mm.

A similar recirculation is employed in the second unit as in the first, in that the liquid discharged from the bottom of the evaporator 74 through a pipe line 59 is combined with the liquid from the vapor separator 71 and conducted through a pipeline 61 to a pump 88 for recirculation back to the top of the evaporator 74 through a pipeline 62, but a portion of the recirculating liquid is removed through a pipeline 63 as a pitch purge. One purpose of recirculating liquid from the vapor separators 71 and 72 to the respective falling film evaporators 74 and 73 is to keep the tubes of said evaporators wet with liquid at all times by maintaining constant flow therethrough.

Typically, if the feed into the top of the falling film evaporator 73 is at the rate of 5380 lbs. per hour, the condensate from the common condenser 92 may be at the rate of 4800 lbs./hr. with production of a product (6) of composition previously given. On this same basis, the combined flow of liquid from the evaporator 73 and vapor separator 72 may be 65 gal. per min., and the recirculation 60 gal. per min., the difference, amounting to about 1940 lbs. per hour being pumped to the top of the evaporator 74. Vapors from the vapor separator 72, at the rate of 3440 lbs. per hour, are combined with vapors at the rate of 1140 lbs. per hour, plus 50 lbs. per hour of steam from the vapor separator 71 to give 4580 lbs. per hour of condensate from the condenser 92. Of the liquid discharged from the bottom of the vapor separator 71 at the rate of 62 gal. per min., 60 gal. per min. are recirculated through the evaporator 74 and 800 lbs. per hour of tall oil pitch are removed as the pitch purge previously referred to. This amounts to a removal of about 17% by weight of the feed drawn off as pitch, and results in a considerable improvement in the color of the product that is obtained at this stage of the process (having the composition of item 6, above). The pitch has a composition such as that given as item 3 above.

About 50 lbs. per hour of steam are admitted through pipe 105 into the top of the evaporator 74 along with the recirculated liquid. The introduction of steam at this point lowers the partial vapor pressure of the tall oil vapors in the evaporator 74 and separator 71 to compensate for the higher temperature (265° C.) that is required because of presence of a larger proportion of higher boiling fractions in the tall oil going to this unit as compared with the tall oil going to the first unit of this combination vaporization system.

In the next operation, the portion of the first side stream product that is to be further processed is conducted as feed stock to a Turbogrid tower 98, illustrated in the flow sheet constituting Fig. 2. The feed stock is run through an intake pipe line 64, preheaters 96 and 97 and a pipe line 65 into the tower 98 onto one of several trays at approximately the mid-height thereof. The tower 98 is maintained at a pressure of 4 mm. of mercury and a corresponding temperature of 190° C., at the top thereof, and at a pressure of 40 mm. of mercury and 267° C. at the bottom thereof.

As in the case of the Turbogrid tower 35, due to the reduced pressure in the tower and the presence of steam, the preheated tall oil, entering the tower at a temperature of about 250° C., is largely vaporized within the tower. The vapors rise through the grid-like trays within the tower, while the liquid phase component trickles downwardly over and through the trays in constant equilibrium with the vapor and steam partial pressures at any given height in the tower.

The tower 98, unlike the Turbogrid tower 35, is provided with a side stream take-off line 77 at a point below the top of the tower at which the temperature inside the tower is at about 220° C. The side stream liquid is conducted through the pipe line 77 into a pump 214, from which it is discharged through a line 78 to storage. The product so obtained is the second side stream product, item 2 above, having the following typical composition:

| | Percent |
|---|---|
| R.A. | 1 |
| F.A. | 97 |
| U. | 2 |

Heads from the tower 98 are led off as vapors through the vapor line 79 to a condenser 99, from which uncondensed vapors and non-condensible gases are led off to barometric condensers (not shown). The condensate from the condenser 99 is conducted through a pipe line 81 to a pump 218. The discharge from the pump 218, which is conducted through a pipe line 82, is split, a part being taken off through a branch line 83 as the second heads fraction, item 5 above, and the balance being recycled as reflux into the top of the tower 98.

The bottoms from the tower 98 are conducted through a pipe line 89 to a pump 210, from which the liquid is discharged through a pipe line 84. This discharge is split, a part being taken off through the branch line 90 as 2nd tall oil bottoms of the composition of item 7 above, and the balance being pumped into the top of a falling film evaporator 87, used as a reboiler, before being returned through a pipe line 91 to the lower portion of the tower 98. The reboiler 87 is indirectly heated by Dowtherm, and direct steam is also introduced to make up for heat losses between the points of discharge from and return to the tower 98.

The rates of flow that are typical for the part of the system illustrated by the sheet of Figure 2 are as follows. Assuming a feed of 3240 lbs. per hour to the Turbogrid tower 98, the side stream taken off through the pipe line 77 is about 1833 lbs. per hour; the bottoms from said tower 98 are about 93 gal. per min. and the recycle of bottoms through the reboiler 87 back to the tower about 90 gal. per min., the difference, or about 1307 lbs. per hour, being taken out as tall oil bottoms, item 7 above; the side stream take-off is at the rate of about 1833 lbs. per hour of the second side stream product, item 2 above; and the condensate from the condenser 99 is discharged at the rate of about 5600 lbs. per hour, of which 5500 lbs. per hour are returned to the tower 98 as reflux. Steam is introduced into the reboiler 87 at the rate of 150 lbs. per hour.

It will be understood that all of the flow rates referred to herein are typical and exemplary of one mode of operation of method. They are not to be considered as fixed, but may be adjusted to give intermediate and end products of somewhat different compositions, as desired.

Returning now to the construction of the Turbogrid towers 35 and 98, these towers are comparable in general respects as to construction and modus operandi to bubble cap and ring-packed towers, except that in place of plates, rings or other packing, the Turbogrid towers employ grid-like trays, such as the trays 100 illustrated in Figures 3 and 4. The Turbogrid towers presently in use in the oil refining field for the fractionation of liquid hydrocarbons have not, to the best of our knowledge, previously been used or suggested for use in the fractional distillation of tall oil.

We have now found that one of the primary advantages of Turbogrids in the fractionation of tall oil is their ability to achieve fractionation with low pressure drop per theoretical plate. A further primary advantage from the standpoint of such heat sensitive material as tall oil is the substantially lower hold-up in the Turbogrid tower as compared with an equivalent bubble cap column. An additional advantage is the lower investment cost that is required in comparison with an equivalent through-put capacity of a bubble cap tower.

Each tray 100 is made of some suitable corrosion resistant material, such as stainless steel, in the form of a circular grid having a peripheral flange 101, which depends downwardly when the grids are installed in place in a tower and which fits snugly against the inner cylindrical wall of the tower. The grid body of each tray is composed of a plurality of bars, or rods, 102, preferably of rectangular cross-section and about ¼" by ¾" in cross-section. The bars 102 are rectilinear and extend in parallel closely spaced relationship between portions of the peripheral flange 101, to which the ends of the bars are secured, as by welding, so that the upper surfaces of all the bars and of the peripheral flange lie flush, all in the same plane.

The under surfaces of the bars 102 are supported on and rigidified by rectilinear main bracing strips 103 extending parallel to said bars, and by shorter cross-bracing strips 104 extending between the several main bracing strips and between said main strips and the peripheral flange 101. In the specific form illustrated, each tray 100 is initially made in sections, such as the outer sections A and B and the inner sections C and D (Fig. 4). Each of the outer sections has a chord-like main bracing strip 103a, while the inner sections C and D have two main bracing strips 103b defining their lateral edges. In assembling these sections the adjacent strips 103a and 103b, or 103b, 103b, as the case may be, are secured together, as by spot welding, bolts, rivets, or the like.

The relationship between the total of the free open areas provided by the spacing, S, between bars and total area of the trays is important from the standpoint of achieving a minimum amount of hold-up in the flow of material within the tower and thus a minimum of pressure drop per theoretical plate. Depending upon the location of the tray, the free open areas are about 20 or 25% of the total cross-sectional area of the tower represented by the tray. In tower 35, each tray has a diameter of 4'6"; there are 31 trays spaced 18" apart; trays 1 to 6 and 16 to 31 from the top have about 25% open area; trays 7 to 15 have about 15% open area; and the feed tray is No. 19 from the top of the tower. We figure that we achieve with our Turbogrids one theoretical plate with two actual plates, or a plate efficiency of approximately 50%.

We claim as our invention:

1. In a method of fractionating a mixture of rosin acids, fatty acids and neutrals, the steps which comprise flowing a preheated confined stream of the mixture in liquid phase into a zone of reduced pressure, withdrawing liquid bottoms from said zone, passing said withdrawn bottoms and steam in contact with each other through a falling film re-boiler for vaporization therein of said bottoms, passing the resulting vaporized bottoms and steam into a lower portion of said zone, withdrawing from an upper portion of said zone a low boiling heads fraction containing a higher proportion of neutrals than said mixture, passing a portion of said withdrawn bottoms into a reduced pressure fractionating zone near a mid-point thereof, withdrawing vapors as heads from said fractionating zone for condensation and return as reflux to said fractionating zone, withdrawing also from said fractionating zone a side stream fraction higher in fatty acids and lower in neutrals than said mixture, withdrawing liquid bottoms from said fractionating zone, passing some of the last mentioned withdrawn bottoms together with steam through a falling film reboiler to vaporize the same and thence back into a lower portion of said fractionating zone, passing another of said last mentioned withdrawn bottoms through a first falling film evaporator, indirectly heating said another portion in said evaporator to partially vaporize the same, passing some of the partially vaporized bottoms from said evaporator into a first vapor separator, passing liquid from said vapor separator into a second falling film evaporator, indirectly heating said liquid in said second falling film evaporator to partially vaporize the same, passing the partially vaporized liquid from said second falling film evaporator into a second vapor separator, passing vapors from said first and second vapor separators into a common condenser and recovering therefrom as condensate a product relatively richer in rosin acids and relatively lower in fatty acids and neutrals than the starting mixture.

2. In a method of fractionally distilling a mixture of rosin acids, fatty acids and neutrals, the preliminary steps of removing actual and potential odor bodies which comprise providing a confined zone of reduced pressure of considerable height as compared with its width and having rectilinearly extending narrow contact surfaces closely spaced laterally and vertically from one another throughout the width and height of said zone to achieve a low pressure drop between successive vertically spaced surfaces, introducing into said zone at a point intermediate the height thereof a preheated liquid stream of said mixture, withdrawing liquid bottoms from said zone, passing said withdrawn bottoms and steam in contact therewith through a falling film reboiler to effect vaporization of said bottoms, passing the resulting vaporized bottoms and steam into a lower portion of said zone for upward passage therethrough as vapors in counter-current relationship to liquid trickling over said contact surfaces and downwardly through the spaces therebetween, withdrawing from an upper portion of said zone a heads fraction containing a higher proportion of neutrals than in said mixture and containing a very substantial proportion of the actual and potential odor bodies in said mixture, condensing said withdrawn heads fraction, removing a purge portion of the resulting condensate as heads and returning the balance of said condensate to said zone as reflux, the liquid and vapors at any given level of said contact surfaces being maintained in equilibrium with each other at the temperatures and pressures there obtaining and the temperature and pressure at the lower portion of said zone being not over about 270° C. and 30 mm. of mercury, respectively.

3. In a method of fractionally distilling a mixture of rosin acids, fatty acids and neutrals, the preliminary steps of removing actual and potential odor bodies which comprise providing a confined zone of reduced pressure of considerable height as compared with its width and having rectilinearly extending narrow contact surfaces closely spaced laterally and vertically from one another throughout the width and height of said zone to achieve a low pressure drop between successive vertically spaced surfaces, introducing into said zone at a point intermediate the height thereof a preheated liquid stream of said mixture, withdrawing liquid bottoms from said zone, passing said withdrawn bottoms and steam in contact therewith through a falling film reboiler to effect vaporization of said bottoms, passing the resulting vaporized bottoms and steam into a lower portion of said zone for upward passage therethrough as vapors in counter-current relationship to liquid trickling over said contact surfaces and downwardly through the spaces therebetween, withdrawing from an upper portion of said zone a heads fraction containing a higher proportion of neutrals than in said mixture and containing a very substantial proportion of the actual and potential odor bodies in said mixture, condensing said withdrawn heads fraction, removing a purge portion of the resulting condensate as heads equivalent to from 4 to 7% by weight of said mixture fed to said zone and returning the balance of said condensate to said zone as reflux, the liquid and vapors at any given level of said contact surfaces being maintained in equilibrium with each other at the temperatures and pressures there obtaining and the temperature and pressure at the lower portion of said zone being about 267° C. and 30 mm. of mercury, respectively.

4. In a method of fractionating a mixture of rosin acids, fatty acids and neutrals, a vaporization method comprising introducing a liquid stream of said mixture into a first falling film exaporating zone to partially vaporize said liquid under reduced pressure, conducting said partially vaporized product into a first vapor separator zone, combining liquid streams from the lower portions of said first evaporator and separator zones, recycling through said first evaporator zone a portion of said first combined liquid streams, introducing the balance of said combined liquid streams into a second falling film evaporator zone, conducting a partially vaporized product from said second evaporator zone into a second vapor separator zone, combining liquid streams from the lower portions of said second evaporator and separator zones, recycling through said second evaporator zone a portion of said second combined streams and removing the balance thereof, combining overhead vapors from both said first and second vapor separator zones and passing said combined vapors through a common condensing zone, and collecting the condensate therefrom to obtain a product having a higher rosin acids and higher fatty acids content than said mixture.

5. In a method of fractionally distilling tall oil, the steps of introducing tall oil into a fractionating zone of reduced pressure to effect partial vaporization thereof, passing liquid phase portions of said tall oil in said zone over extended contact surfaces closely spaced laterally from each other in horizontal planes spaced vertically throughout the height of said zone to trickle over said surfaces and downwardly through said lateral spacings, withdrawing vapors from the top of said zone, condensing said vapors, returning said condensed vapors as reflux to said zone, withdrawing liquid bottoms from said zone, passing said withdrawn bottoms through a reboiler heated sufficiently to make up heat losses between the points of withdrawal of said liquid bottoms from and their return to said zone, introducing steam in said reboiler for admixture with said liquid bottoms, vaporizing said liquid bottoms in said reboiler and returning said vaporized bottoms to the lower portion of said zone for passage upwardly through and in vapor pressure equilibrium with said downwardly trickling liquid phase.

6. In a method of fractionally distilling tall oil, the steps of introducing tall oil into a fractionating zone of reduced pressure to effect partial vaporization thereof, passing liquid phase portions of said tall oil in said zone over extended contact surfaces closely spaced laterally from each other in horizontal planes spaced vertically throughout the height of said zone to trickle over said surfaces and downwardly through said lateral spacings, withdrawing vapors from the top of said zone, condensing said vapors, returning said condensed vapors as reflux to said zone, withdrawing liquid bottoms from said zone, passing said withdrawn bottoms through a falling film reboiler heated sufficiently to make up heat losses between the points of withdrawal of said liquid bottoms from and their return to said zone, introducing steam in said reboiler for admixture with said liquid bottoms, vaporizing said liquid bottoms in said reboiler and returning said vaporized bottoms to the lower portion of said zone for passage upwardly through and in vapor pressure equilibrium with said downwardly trickling liquid phase, the upper portion of said zone being at a temperature not over about 210° C. and a pressure not over about 10 mm. of mercury and the lower portion of said zone being at a temperature not over about 270° C. and a pressure not over about 30 mm. of mercury.

7. In a method of fractionally distilling tall oil, the steps of introducing tall oil into a fractionating zone of reduced pressure to effect partial vaporization thereof, passing liquid phase portions of said tall oil in said zone over extended contact surfaces closely spaced laterally from each other in horizontal planes spaced vertically throughout the height of said zone to trickle over said surfaces and downwardly through said lateral spacings, withdrawing vapors from the top of said zone, condensing said vapors, returning said condensed vapors as reflux to said zone, withdrawing liquid bottoms from said zone, passing said withdrawn bottoms through a falling film reboiler heated sufficiently to make up heat losses between the points of withdrawal of said liquid bottoms from and their return to said zone, introducing steam in said reboiler for admixture with said liquid bottoms, vaporizing said liquid bottoms in said reboiler and returning said vaporized bottoms to the lower portion of said zone for passage upwardly through and in vapor pressure equilibrium with said downwardly trickling liquid phase, the upper portion of said zone being at a temperature not over about 190° C. and a pressure not over about 4 mm. of mercury and the lower portion of said zone being at a temperature not over about 267° C. and a pressure not over about 40 mm. of mercury and withdrawing a side stream from near the top of said zone having a higher fatty acids content and a lower rosin acids and neutrals content than said tall oil fed into said zone.

8. A vaporization process for fractionating a mixture of rosin acids, fatty acids and neutrals, comprising introducing a liquid stream of said mixture into a first falling film evaporating zone to partially vaporize said liquid under reduced pressure, conducting said partially vaporized product into a first vapor separator zone, combining liquid streams from said first evaporator and separator zones, recycling through said first evaporator zone a portion of said combined liquid streams, introducing the balance of said liquid streams into a second falling film evaporating zone maintained at a higher temperature but at about the same reduced pressure as said first falling film evaporator, conducting a partially vaporized product from said second evaporator zone into a second vapor separator zone, combining liquid streams from said second evaporator and separator zones, recycling through said second evaporating zone a portion of said second combined liquid streams and removing the balance thereof as a fraction higher in neutrals than said initial mixture, combining overhead vapors from both said first and second vapor separator zones and passing the same through a common condensing zone, and collecting the condensate therefrom to obtain a product having a lower rosin-acids and a higher fatty-acids content than said initial mixture.

9. In a vaporization process for a thermally sensitive organic mixture, the steps of arranging two pairs of falling film evaporating zones and connected vapor separating zones in series with a common condensing zone, maintaining said evaporating zones at approximately the same pressure, taking off vapors from the first falling film evaporating zone at a temperature sufficiently low to prevent thermal decomposition of said mixture, returning a portion of liquid withdrawn from said first evaporating zone and from said first vapor separating zone to said first evaporating zone to maintain constant flow therethrough, conducting the remainder of liquid so withdrawn to said second evaporating zone, withdrawing liquid from said second evaporating zone and said second vapor separating zone for recirculation through said second evaporating zone to maintain constant flow therethrough, conducting overhead vapors from both said first and second vapor separating zones to said common condensing zone and recovering the condensate from said common condensing zone.

10. In a vaporization process for a thermally sensitive organic mixture, the steps of arranging two pairs of falling film evaporating zones and connected vapor separating zones in series with a common condensing zone, maintaining said evaporating zones at approximately the same pressure, taking off vapors from the first falling film evaporating zone at a temperature sufficiently low to prevent thermal decomposition of said mixture, returning a portion of liquid withdrawn from said first evaporating zone and from said first vapor separating zone to said first evaporating zone to maintain constant flow therethrough, conducting the remainder of liquid so withdrawn to said second evaporating zone, withdrawing liquid from said second evaporating zone and said second vapor separating zone for recirculation through said second evaporating zone to maintain constant flow therethrough, withdrawing from said system a part of said liquid withdrawn from said second evaporating and vapor separating zones, introducing steam into said second evaporating zone along with said recirculated liquid to compensate for higher temperatures in said second than in said first evaporating zone, conducting overhead vapors from both said first and second vapor separating zones to said common condensing zone and recovering the condensate from said common condensing zone.

References Cited in the file of this patent

UNITED STATES PATENTS

| | | |
|---|---|---|
| 2,224,984 | Potts | Dec. 17, 1940 |
| 2,688,590 | Sisson et al. | Sept. 7, 1954 |